US007315255B2

(12) United States Patent
Sotiriou

(10) Patent No.: US 7,315,255 B2
(45) Date of Patent: *Jan. 1, 2008

(54) LOAD STATUS INDICATOR

(75) Inventor: George Sotiriou, Patchogue, NY (US)

(73) Assignee: George Sortiriou, Farmingville, NY (US)

( * ) Notice: Subject to any disclaimer, the term of this patent is extended or adjusted under 35 U.S.C. 154(b) by 233 days.

This patent is subject to a terminal disclaimer.

(21) Appl. No.: 11/107,449

(22) Filed: Apr. 15, 2005

(65) Prior Publication Data

US 2006/0232435 A1 Oct. 19, 2006

(51) Int. Cl.
*G08B 5/00* (2006.01)
*G08B 21/00* (2006.01)
*H02H 3/08* (2006.01)

(52) U.S. Cl. .................. 340/815.4; 340/635; 340/657; 340/650; 340/661; 340/664; 361/93.1; 361/88; 361/90

(58) Field of Classification Search ............ 340/815.4, 340/657, 660, 636.16
See application file for complete search history.

(56) References Cited

U.S. PATENT DOCUMENTS 3,644,886 A 2/1972 Sabaroff .................... 340/458
4,055,831 A 10/1977 Sakurai et al. ............. 340/458
4,311,994 A * 1/1982 Kuribayashi ............... 340/661
4,394,647 A * 7/1983 Van Dine .................. 340/645
4,401,972 A 8/1983 Lupoli ........................ 340/458
4,447,806 A 5/1984 Gundel et al. ............. 340/641
4,797,608 A * 1/1989 White ......................... 324/96
5,070,301 A 12/1991 Schweitzer, Jr. ............ 324/126
5,757,275 A * 5/1998 Mowry, Jr. ................. 340/664
6,075,448 A * 6/2000 Verkhovskiy ............... 340/657
6,720,883 B2 * 4/2004 Kuhr et al. ................. 340/642
6,828,915 B2 * 12/2004 Gottlieb ...................... 340/653
2005/0248897 A1 * 11/2005 Sadjadi ....................... 361/115
2006/0244620 A1 * 11/2006 Sotiriou ................... 340/815.4

* cited by examiner

*Primary Examiner*—Donnie L. Crosland
(74) *Attorney, Agent, or Firm*—Brake Hughes Bellermann LLP; Shane A. Kennedy

(57) ABSTRACT

A load status indicator is disclosed wherein a green light-emitting diode of a bi-color light-emitting diode lights up when power is available to but not being used by a monitored device, whereas a red light-emitting diode of the bi-color light-emitting diode lights up when the monitored device is drawing current. The load status indicator utilizes a coil in series with the monitored device, a reed switch controlled by the coil, and field-effect transistors to control which light-emitting diode lights up depending on whether power is available and whether the monitored device is drawing current.

18 Claims, 6 Drawing Sheets

LOAD STATUS INDICATOR

BACKGROUND OF THE INVENTION

1. Field of the Invention

The present invention relates to electrical circuits for detecting and displaying the availability to, and use of power by, a load.

2. Related Art

There are many settings in which knowing whether a control element, such as a solenoid, motor, pump, or compress, is running or not, is of great importance. For example, boats have a bilge pump to get rid of any water that may accumulate in the bilge. The pump is usually placed in the lowest part of the bilge and controlled by a float switch. It is difficult to know whether the pump is running or not. One solution to this problem has been the pilot light shown in FIG. 1.

FIG. 1 shows a typical pilot light that indicates when the on/off switch is in the on position and power is available to the load. However, this pilot light does not show whether the float is in the active position or whether the pump is running.

FIG. 2 shows an improvement of the pilot light shown in FIG. 1, indicating when the float is active and power is available. However, this pilot light still does not show whether the pump is running. Further, the wires that connect the pilot light to the pump must be capable of carrying the breaker current rating, and the wires must be run to the pump, which can be a long distance. FIG. 3 uses a second pilot light to indicate whether power is available. The other characteristics are the same as for the pilot light of FIG. 2.

Bi-color light-emitting diodes have two light-emitting diodes inside one lens package, usually red and green. They can come in 3-pin or 2-pin packages. The E231 and E292 models are 3-pin packages. The pins of the E292 are a red cathode, a green cathode, and a common anode. With the anode voltage greater than the red cathode voltage by 2.2 volts, the red light-emitting diode will light up; with the anode voltage greater than the green cathode voltage by 2.2 volts, the green light-emitting diode will light up. The pins of the E231 are a red anode, a green anode, and a common cathode. With the red anode voltage greater than the cathode voltage by 2.2 volts, the red light-emitting diode will light up; with the green anode voltage greater than the cathode voltage by 2.2 volts, the red light-emitting diode will light up. Reed switches, which are generally inexpensive devices, close in response to a magnetic field. They generally consist of a pair of flexible reeds made of a magnetic material sealed in a glass tube filled with inert gas. The reeds extend outside the tube in opposite directions, and overlap inside the tube but are separated by a small gap. Because of the gap, the reeds constitute an open circuit. Application of a magnetic field to the reed switch causes both reeds to be magnetized. If the magnetic attracting force overcomes the resistive force caused by the elasticity of the reeds, the reeds come into contact, closing the circuit. The magnetic field can be generated by a magnet or a current flowing through a coil nearby. Once the magnetic field is removed, the reeds separate, and the circuit is opened.

Field-effect transistors (FETs) have three terminals: a gate, a source, and a drain. Conduction in the channel between the source and the drain is controlled by an electric field applied to the gate; the resistance between the source and the drain is determined by the voltage difference between the gate and the source. In N-channel FETs, the voltage at the gate must be greater then the voltage at the source to allow current to flow between the source and the drain.

SUMMARY OF THE INVENTION

The present invention is a load status indicator which utilizes a pair of visual status indicators which are part of an indicating component that is connected in parallel with the load and a current sensitive component. The visual status indicators turn on or off in response to whether current is flowing through the load.

BRIEF DESCRIPTION OF THE DRAWINGS

The accompanying drawings illustrate several aspects of embodiments of the present invention. The drawings are for the purpose only of illustrating preferred modes of the invention, and are not to be construed as limiting the invention.

DESCRIPTION OF THE PREFERRED EMBODIMENTS

The preferred embodiment enables a bi-color LED to indicate green when power is available to a load but the load is not drawing current, and red when power is available and the load is drawing current. The indicating circuit, which includes the bi-color LED, draws approximately 250 milliwatts directly from the supply voltage of twelve volts DC; because the indicating circuit is connected in parallel with the series of current-responsive component, preferably a coil, and the load, the indicating circuit does not reduce the voltage or power available to the load. The power that is dissipated by the coil is equal to the square of the current flowing through the load times the resistance of the coil. With a coil resistance of 0.001 ohms and a maximum design current of thirty amperes, the power dissipated by the coil is 0.9 watts. This dissipation of power by the coil in series with the load has a negligible effect on the load.

Figure 1:
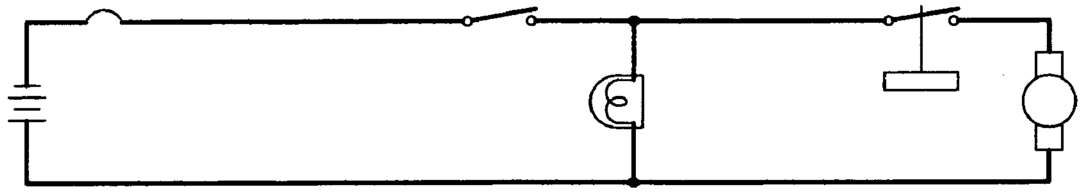
Fig. 1 (PRIOR ART)
FIG. 1 is a circuit diagram of a prior art pilot light.
Figure 2:
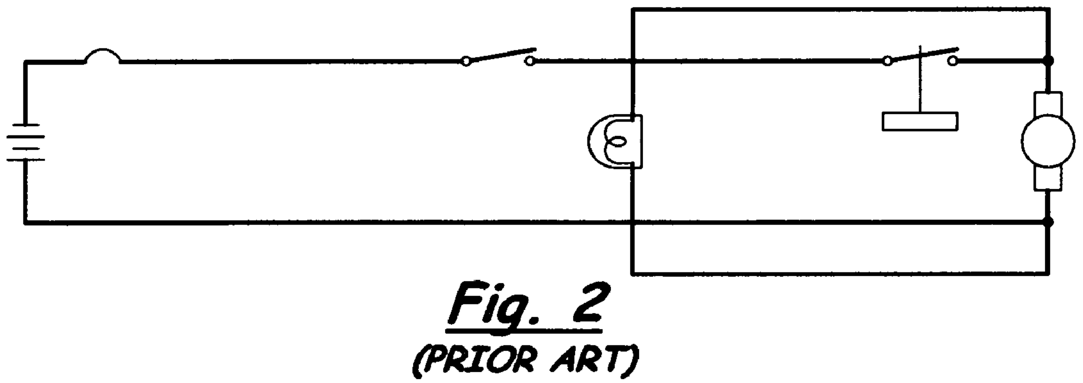
Fig. 2 (PRIOR ART)
FIG. 2 is a circuit diagram of an alternative prior art pilot light.
Figure 3:
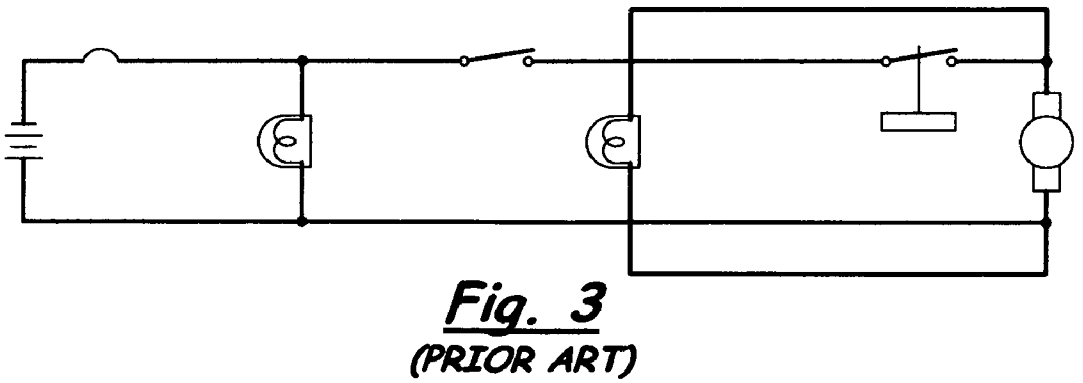
Fig. 3 (PRIOR ART)
FIG. 3 is a circuit diagram of another prior art pilot light.
Figure 4:
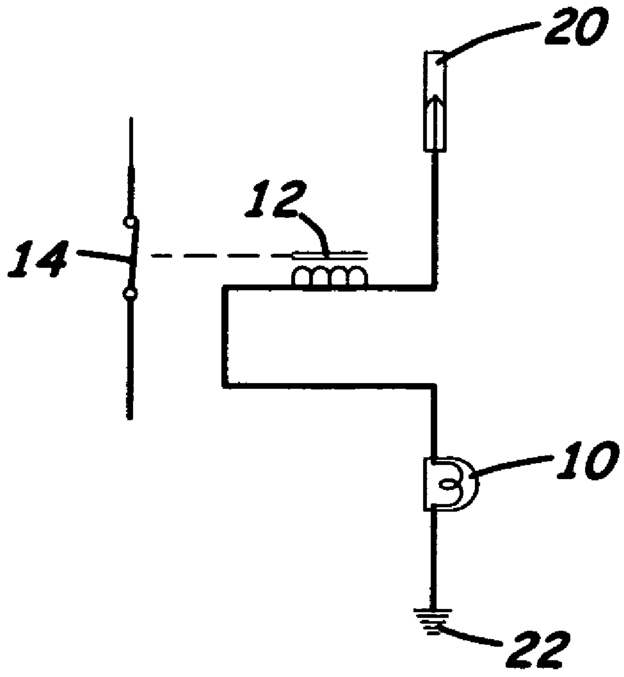
FIG. 4 is a circuit diagram showing the coil and reed switch preferably utilized in the invented load status indicator.

In the preferred embodiment, the load 10 to be monitored is connected in series with a coil 12, as shown in FIG. 4. The coil 12 is preferably made of nine turns of number 16 AWG (American wire gauge) copper magnetic wire wound tightly around a single pole, single throw reed switch 14. The reed switch 14 preferably has a design sensitivity of between ten and fifteen IN (amp turns). The coil 12 is preferably wrapped around the reed switch 14. The dashed line in FIGS. 4, 6, 7, and 9 shows the connection between the coil 12 and the reed switch 14 caused by the influencing magnetic field.

With the coil 12 having nine turns of copper wrapped around the reed switch 14, the reed switch 14 will have a pickup threshold of 1.6 amperes running through the coil, and a dropout threshold of 1.4 amperes. The hysteresis of 0.2 amperes is a physical characteristic of a reed switch which ensures a stable transition between pickup and dropout. The threshold can be increased (from, for example, 1.6 amperes to 2.0 amperes) by reducing the number of turns of copper wire; conversely, the threshold can be decreased (from, for example, 1.6 amperes to 1.2 amperes) by increasing the number of turns of copper wire on the reed switch 14.

The power dissipated across the coil (which is equal to the current squared times the resistance) at full load is a major design consideration. With nine turns of copper around the reed switch 14, the impedance of the coil is 0.001 ohms, and the power dissipated across the coil 12, which is preferably the only component connected in series with the load 10, is just under one watt (approximately 0.3% of the load power) with a current of thirty amperes. Thus, the loss of power to the load 10 due to the load status indicator 5 is small.

Components other than the reed switch 14 and coil 12 could be used and still have the switch open or close in response to whether current is flowing through the load 10. For example, a similar coil with a ferromagnetic core for concentrating the magnetic field of the coil combined with a Hall-effect switch or giant magneto resistor would also cause a switch to be open when current is not flowing through the load 10 and closed when current is flowing through the load 10. Or, a shunt resistor with a high-side current-sense amplifier would also work to cause the switch to be responsive to whether current is flowing through the load 10. However, the reed switch 14 and coil 12 are preferred because of their low cost.

Figure 5:
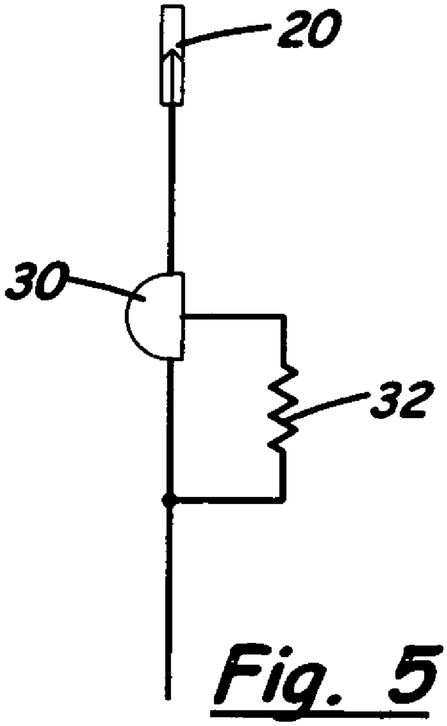
FIG. 5 is a circuit diagram showing the current regulator preferably utilized in the load status indicator.

As shown in FIG. 5, a voltage regulator 30 is preferably connected in parallel with a first resistor 32 to create a constant current source. This allows the remaining components to be designed with the assumption of a constant input current, which ensures a constant brightness of the LEDs when they light up, and reduces the power drawn from the supply 20. The voltage of the supply 20 will generally be in the range of 12 to 30 volts. The preferred model for the voltage regulator 30 is LM317Z, which regulates the voltage at 1.2 volts. With the first resistor 32 having a preferred resistance of 56.2 ohms, the current flowing into the first node 34 will be 22 milliamperes.

Figure 6:
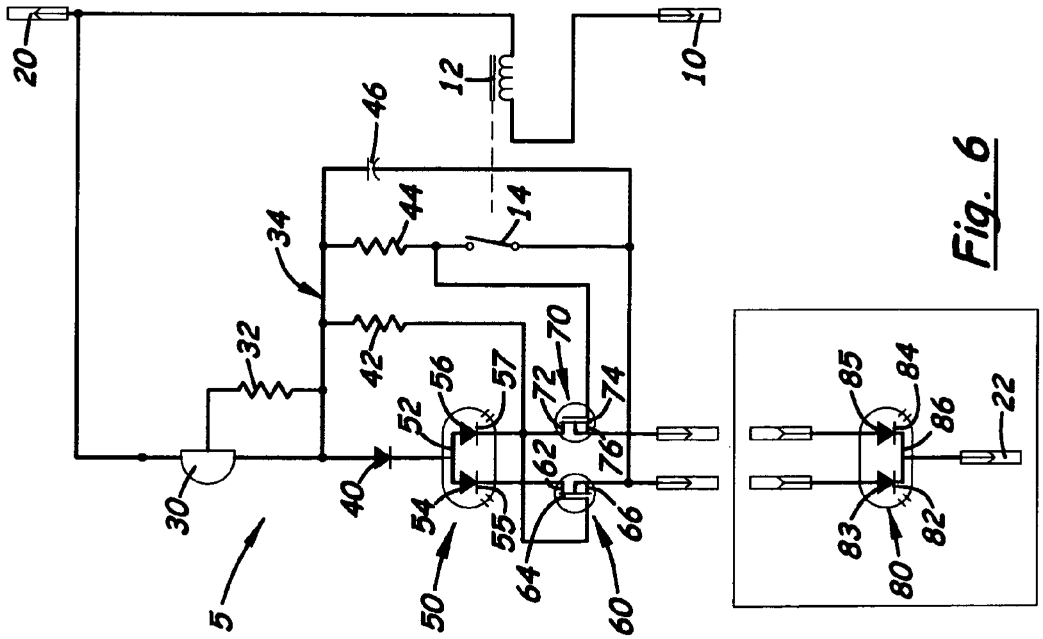
FIG. 6 is a circuit diagram showing the preferred embodiment of the load status indicator applied to a load utilizing a direct current voltage source.

The preferred circuit will be described as being used with a twelve-volt direct current source, and is shown in FIG. 6. Whether or not current is flowing through the load 10 and coil 12, the voltage drop across the series of the first diode 40 and the first bi-color light-emitting diode 50 and either the first or second FET 60, 70 is approximately 3.5 volts. The FETs used in the preferred embodiment are N-channel DMOSs which switch from high to low impedance when the voltage difference between the gate and the source is approximately 3.5 volts. The FETs 60, 70 control whether current may flow through each LED 54, 56 in the first bi-color LED 50.

The remaining components of the preferred embodiment of the load status indicator are a first diode 40 (model number 1N4148), two visual status indicators, preferably a first bi-color LED 50 (model number E292), a second resistor 42 having a resistance of 100 kiloohms, a third resistor 44 having a resistance of 100 kiloohms, a capacitor 46 having a capacitance of ten microfarads, a first FET 60 (an N-channel DMOS), and a second FET 70 (also an N-channel DMOS). A zener diode could also be used for the first diode 40. Transistors other than field-effect transistors could be used, but are not preferred because they would necessitate more components in the circuit, and hence greater expense. The resistors and capacitor could also have different resistance and capacitance values and still achieve the switching effects of the invention. The load status indicator will also preferably have a remote indicator with a second bi-color LED 80 (model number E231). The capacitor 46, which is preferably made of tantalum, ensures the stability of the current flowing through the load status indicator 5, and also ensures clean switching of the FETs 60, 70, from high impedance to low impedance.

The first diode 40, the second resistor 42, the third resistor 44, and the capacitor 46 are each connected to a first node 34. The anode of the first diode 40 is connected to the first node 34 so that current may flow into the first diode 40 from the first node 34. The cathode of the first diode 40 is connected to the anode 52 of the first bi-color LED 50 so that current may flow into the first bi-color LED 50 from the first diode 40.

The red cathode 55 of the first bi-color LED 50 is connected to the first drain 62 of the first FET 60; if the first gate 64 of the first FET 60 is biased high, approximately 3.5 volts, then the first FET 60 will switch to low impedance, allowing current to flow from the red cathode 55 of the first bi-color LED 50 into the first drain 62 and out of the first source 66 to ground 22. The green cathode 57 of the first bi-color LED 50 is connected to the second drain 72 of the second FET 70, to the first gate 64 of the first FET, and to the end of the second resistor 42 opposite from the first node 34; if the second gate 74 of the second FET 70 is biased high, approximately 3.5 volts, then the second FET 70 will switch to low impedance, allowing current to flow from the green cathode 57 of the first bi-color LED 50 into the second drain 72 of the second FET 70 and out of the second source 76 to ground 22.

As discussed above, the first end of the second resistor 42 is connected to the first node 34; the second end of the second resistor 42 is connected to the green cathode 57 of the first bi-color light-emitting diode 50, to the second drain 72 of the second FET 70, and to the first gate 64 of the first FET 60. The first end of the third resistor 44 is connected to the first node 34; the second end of the third resistor 44 is connected to the second gate 74 of the second FET 70, and to the first end of the reed switch 14. The first end of the reed switch 14 is connected to the second end of the third resistor 44 and to the second gate 74 of the second FET 70; the second end of the reed switch 14 is connected to the first source 66 of the first FET 60 and to the second end of the capacitor 46. The first end of the capacitor 46 is connected to the first node 34; the second end of the capacitor 46 is connected to the second end of the reed switch 14 and to the first source 66 of the first FET 60.

The first source 66 of the first FET 60 may be grounded, or may be remotely connected to a red anode 83 of a second bi-color LED 80, preferably model E231. The second source 76 of the second FET 70 may also be grounded or remotely connected to a green anode 85 of the second bi-color LED 80. With these remote connections, the red LED 82 of the second bi-color LED 80 will light up when the red LED 54 of the first bi-color LED 50 lights up, and the green LED 84 of the second bi-color LED 80 will light up when the green LED 56 of the first bi-color LED 50 lights up. This allows the status of the load 10 to be monitored from a location remote from the load 10.

Figure 8:
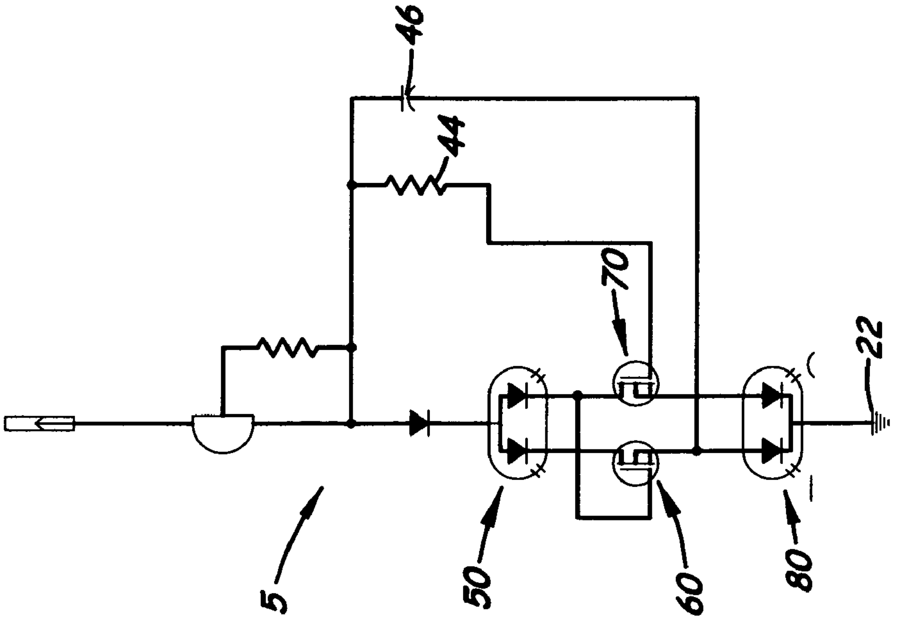
FIG. 8 is a circuit diagram showing the preferred embodiment of the load status indicator without the reed switch or second resistor when current is not flowing through the load; at this point, the reed switch and second resistor are ineffective.

FIG. 8 is a schematic diagram of the load status indicator 5 when the supply 20 is providing voltage, but no current is flowing through the load 10. When no current is flowing through the load 10, there will also be no current flowing through the coil 12. In this circumstance, the reed switch 14 will be open. The second gate 74 of the second FET 70 will be biased high through the third resistor 44, approximately 3.5 volts, switching the second FET 70 to low impedance. This allows current to flow out of the green cathode 57 of the first bi-color LED 50 and through the second FET 70. Because the first gate 64 of the first FET 60 is connected to the second drain 72 of the second FET 70, the first gate 64 is biased low, approximately zero volts. This causes the second resistor 42 to effectively become an open circuit. Because the first gate 64 is biased low, the first FET 60 has high impedance, and no current can flow through the first FET 60 or out of the red cathode 55 of the first bi-color LED 50. Therefore, the first and second bi-color LEDs 50, 80 light up green but not red.

Figure 9:
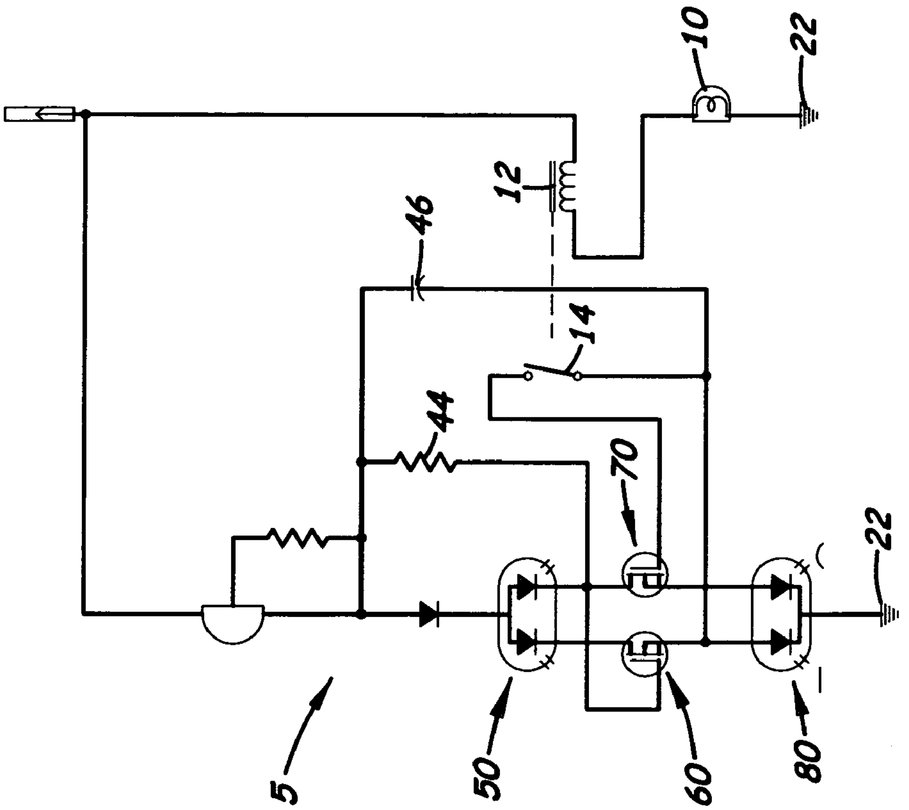
FIG. 9 is a circuit diagram showing the preferred embodiment of the load status indicator without the third resistor when current is flowing through the load; at this point, the third resistor is ineffective.

FIG. 9 is a schematic diagram of the load status indicator 5 when the supply 20 is providing voltage and current is flowing through the load 10. If current is flowing through the load 10, then in all likelihood the load 10, such as a motor, is operating. With the minimum threshold current, 1.6 amperes in the preferred embodiment, flowing through the load 10 and the coil 12, the reed switch 14 will close, creating a short circuit across the reed switch 14. Because the second gate 74 is now connected to the first source 66, the second gate 74 is biased low, approximately zero volts. Because the second gate 74 is biased low, the impedance of the second FET 70 is switched to high, preventing current from flowing out of the green cathode 57 of the first bi-color LED 50 and through the second FET 70. The third resistor 44 effectively acts as an open circuit because the reed switch 14 has turned the second FET 70 off. The first gate 64 of the first FET 60 is now biased high, approximately 3.5 volts. This switches the impedance of the first FET 60 to low, allowing current to flow out of the red cathode 55 of the first LED 50 and through the first FET 60. The result is that the first and second bi-color LEDs 50, 80, light up red but not green.

Because the first and second FETs 60, 70 lead to ground or neutral, possibly through remote status indicators, and the load 10 leads to ground or neutral, all of the components of the load status indicator 5 except the coil 12 may be considered to be connected in parallel with the series of coil 12 and load 10. Thus, the indicating circuit is connected in parallel with the series of coil 12 and load 10. This parallel connection allows the load status indicator 5 to function without reducing the power available to the load 10 when the load 10 is powered by a voltage source.

Figure 7:
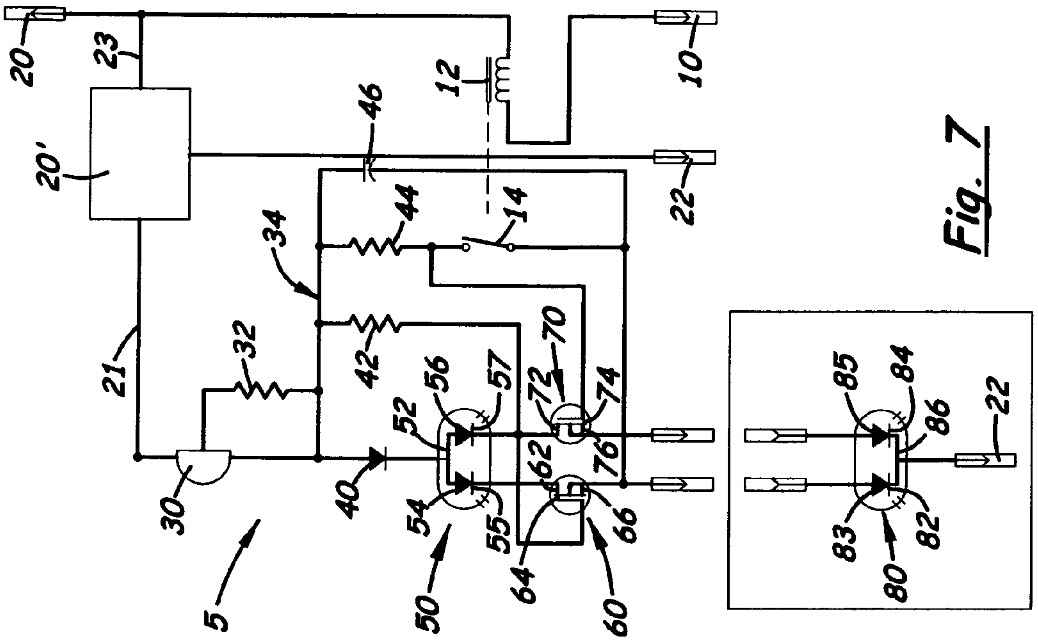
FIG. 7 is a circuit diagram showing the preferred embodiment of the load status indicator applied to a load utilizing an alternating current voltage source.
Figure 10:
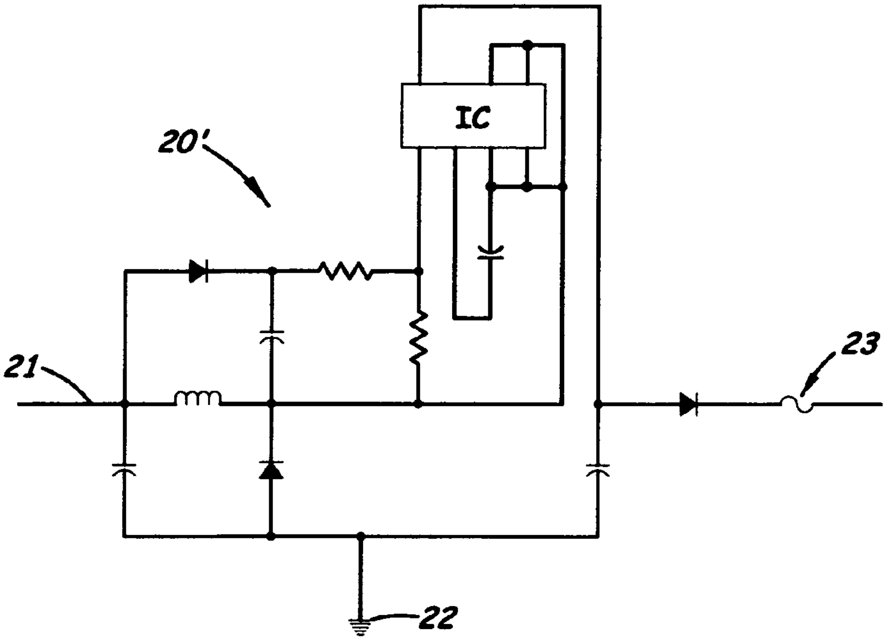
FIG. 10 shows the non-isolated AC to DC power supply utilized in the embodiment shown in FIG. 7.

The load status indicator 5 can also monitor a load 10 that has an alternating current (AC) supply. The circuit diagram for this embodiment is shown in FIG. 7; load status indicator 5 would be designed identically to the DC version with the exception that a twelve-volt DC non-isolated AC to DC power supply 20' must be connected to the voltage regulator 30, the AC supply is connected to the first end of the coil 12 and the supply 20 (which is now AC), and the non-isolated AC to DC power supply 20' must be grounded, as shown in FIG. 10. The non-isolated AC to DC power supply 20' utilizing an integrated circuit is shown schematically in FIG. 10, including the integrated circuit IC, the first AC terminal 21 that is connected to the voltage regulator 30, the second AC terminal 23 that is connected to the coil 12 and the supply 20, and the neutral terminal which is connected to ground 22.

Figure 11:
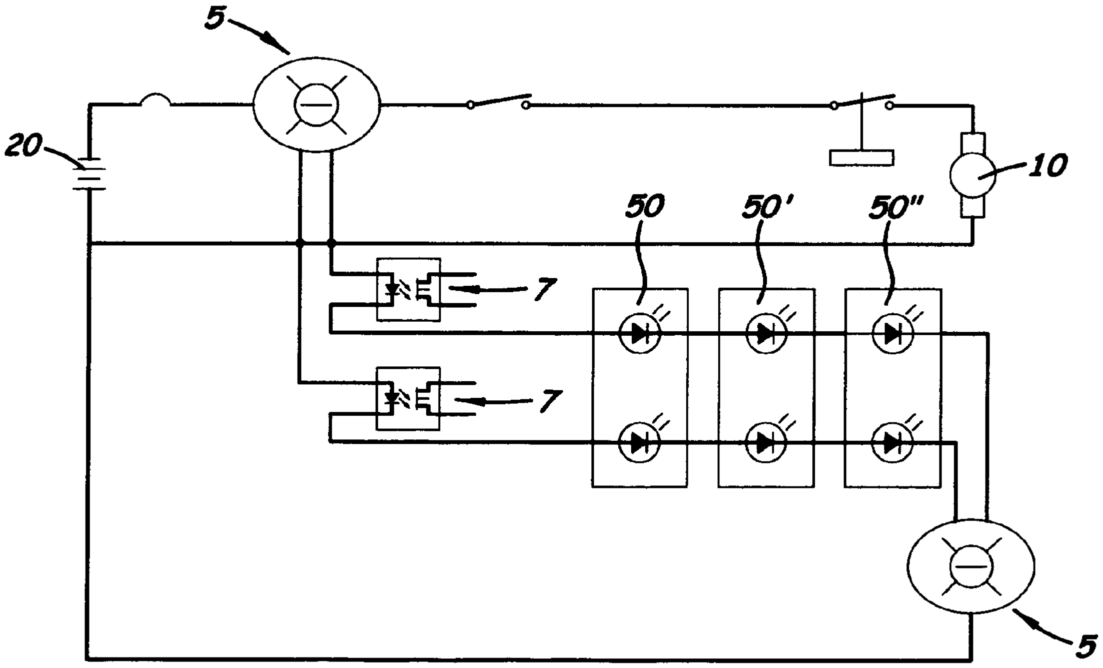
FIG. 11 shows an application of the load status indicator utilizing multiple indicators.

The load status indicator could also utilize multiple indicators, as shown in FIG. 11. With a twelve-volt source, the voltage drop from the supply 20 through the first diode 40, the first bi-color LED 50, and either the first FET 60 or the second FET 70, to the first source 66 or to the second source 76, is approximately 5.5 volts, with 6.5 volts available to power additional LEDs. With a typical LED having a voltage drop of approximately 2.2 volts at 20 milliamperes of current, three such bi-color LEDs 50, 50', 50" could be connected in series for remote indication of the status of the load 10. Opto relays 7 could also be connected in series with the load status indicator 5 and bi-color LEDs 50, 50', 50" to generate signals for processing by other systems.

Figure 12A:
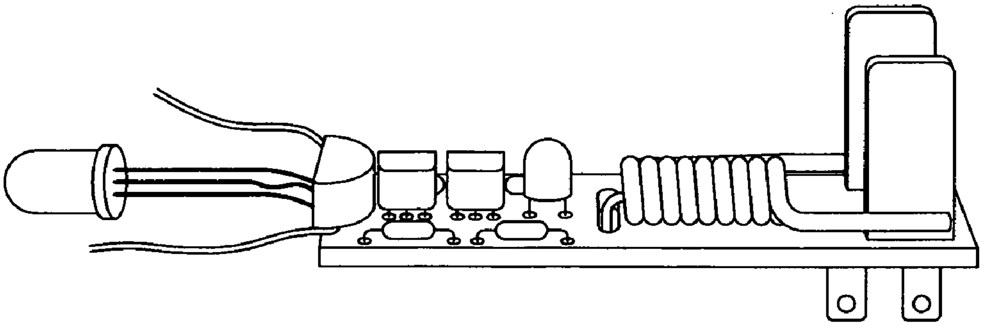
FIG. 12A is an illustration of the preferred embodiment of the load status indicator.
Figure 12B:
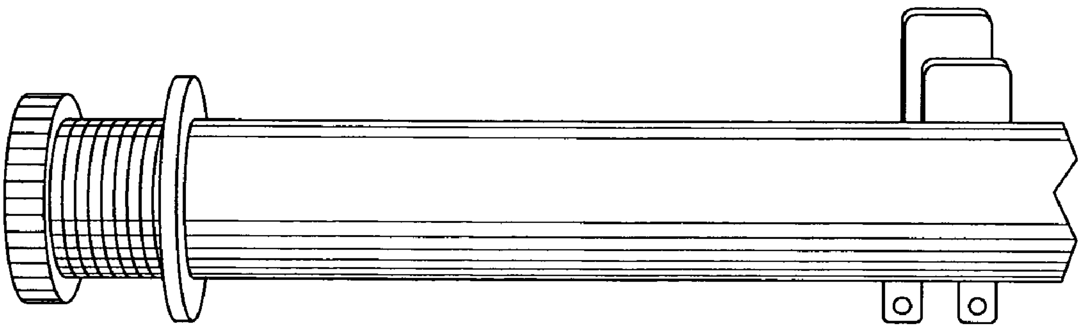
FIG. 12B is an illustration of the preferred embodiment of the load status indicator installed into the preferred housing for display of the bi-color LED.

Because all of the components except the coil 12 are in parallel with the load 10, rather than in series with the load 10, those components do not reduce the power available to the load 10. The only component connected in series with the load 10, the coil 12, draws only a small amount of power from the load 10, typically less than one watt at the maximum design load of thirty amperes. Thus, the load status indicator 5 herein described enables one to continuously monitor the load 10 without reducing the power available to the load. Because the load status indicator 5 herein described causes one visual status indicator, but not the other, to light up depending on whether the load 10 is drawing current, the load status indicator 5 enables use of bi-color light-emitting diodes to clearly show one of three states (no color for no power available, green for power available but not in use, or red for power available and in use) with a single lens package. Colors other than red and greed could be used for the LEDs. The preferred embodiment is shown in FIG. 12A, and the preferred embodiment is shown housed for display of the first bi-color LED 50 in FIG. 12B.

One application of the present invention is to a bilge pump of a boat. The load status indicator will indicate red whenever the pump is running and drawing current, confirming proper operation of both the pump and the float; the load status indicator will indicate green when power is available but there is a failure in or near the pump. The components remotely indicating the status of the load can be connected to the source of each of the two FETs. In this application, the load status indicator would be installed in the power distribution panel and the remote indicators would be installed in the navigation center. The load status indicator could also be used to monitor all essential and nonessential loads on a boat in order to maintain good electrical power management.

Another application of the present invention is monitoring whether a control element, such as a solenoid, motor, pump, or compress is running. The load status indicator would indicate whether the element was on and drawing current.

Another application of the present invention is on a motor home in which propane is used for cooking or heating. The load status indicator could be used to indicate the true status of the safety solenoid. A switch is used to turn on the flow of propane whenever there is a need to heat or cook. The load status indicator would indicate whether power was available and whether the solenoid was actually energized. If the switch were on and the load status indicator indicated green but not red, then this would indicate that the solenoid was defective and needed to be replaced. The load status indicator could also be used to confirm that a carbon monoxide detector was receiving power for operation and did not have an internally blown fuse. If the load status indicator were indicating red, then the carbon monoxide detector would be drawing current, and the fuse must be functional.

Although this invention has been described above with reference to particular means, materials and embodiments, it is to be understood that the invention is not limited to these disclosed particulars, but extends instead to all equivalents within the scope of the following claims.

I claim:

1. A load status indicator comprising:
a first transistor and a second transistor;
a first visual status indicator and a second visual status indicator;
wherein the load status indicator is connected to a voltage supply and a load;
wherein the load status indicator is configured to bias the second transistor to low impedance and to bias the first transistor to high impedance when current is not flowing through the load;
wherein the load status indicator is configured to bias the second transistor to high impedance and to bias the first transistor to low impedance when current is flowing through the load;
wherein the load status indicator is configured to cause the first visual status indicator to turn on when the first transistor is biased to low impedance; and
wherein the load status indicator is configured to cause the second visual status indicator to turn on when the second transistor is biased to low impedance.

2. The load status indicator of claim 1 wherein:
a drain of the second transistor is connected to a gate of the first transistor;
a gate of the second transistor is connected to a first end of a switch;
the load status indicator is configured so that the switch is open when current is not flowing through the load, and the switch is closed when current is flowing through the load; and
a source of the first transistor is connected to a second end of the switch.

3. The load status indicator of claim 2 wherein:
the switch is a reed switch; and
the reed switch is controlled by a coil connected in series with the load.

4. The load status indicator of claim 3 wherein:
the first visual status indicator is a first light-emitting diode; and
the second visual status indicator is a second light-emitting diode.

5. The load status indicator of claim 4 wherein a first hi-color light-emitting diode comprises the first light-emitting diode and the second light-emitting diode.

6. The load status indicator of claim 5 wherein:
the source of the first transistor is connected to an anode of a second hi-color light-emitting diode;
a source of the second transistor is connected to an anode of a second hi-color light-emitting diode; and
a capacitor is connected in series between the source of the first transistor and the voltage source.

7. The load status indicator of claim 5 wherein the first transistor and second transistor are field-effect transistors.

8. A load status indicator comprising:
a first visual status indicator and a second visual status indicator;
wherein the visual status indicators are not connected in series with a load;
wherein the first visual status indicator is configured to indicate when power is available to the load but current is not flowing through the load; and
wherein the second visual status indicator is configured to indicate when power is available to the load and current is flowing through the load.

9. The load status indicator of claim 8 further comprising:
a switch that is not connected in series with the load;
wherein the switch is configured to open and close in response to whether current is flowing through the load.

10. The load status indicator of claim 8 further comprising:
a coil connected in series with the load;
a reed switch that is not connected in series with the load;
wherein the reed switch is configured to open and close in response to whether current is flowing through the coil.

11. The load status indicator of claim 10 further comprising:
a first field-effect transistor and a second field-effect transistor;
wherein a drain-source channel of the first field-effect transistor is connected in series with the first visual status indicator; and
the second visual status indicator is connected to a terminal of the second field-effect transistor, the terminal being selected from the group consisting of a drain and a source.

12. The load status indicator of claim 11 wherein a bi-color light-emitting diode comprises the first and second visual status indicators.

13. A load status indicator comprising:
a current-sensing component connected in series with a load;
an indicating circuit connected in parallel with the series of load and current-sensing component;
wherein the indicating component comprises a first visual status indicator and a second visual status indicator;
wherein the first visual status indicator is configured to turn on when power is available to the load and indicating circuit, but a threshold current is not flowing through the current-sensing component, and to turn off when a threshold current is flowing through the current-sensing component;
wherein the second visual status indicator is configured to turn on when power is available to the load and indicating circuit, and a threshold current is flowing through the current-sensing component, and to turn off when a threshold current is not flowing through the current-sensing component.

14. The load status indicator of claim 13 wherein the indicating component further comprises a switch which is configured to open when a threshold current flows through the current-sensing component.

15. The load status indicator of claim 14 wherein the switch is a reed switch and the current-sensing component is a coil wound around the reed switch.

16. The load status indicator of claim 15 wherein the indicating component further comprises:
a first transistor configured to control whether current can flow through the first visual status indicator; and
a second transistor configured to control whether current can flow through the second visual status indicator.

17. The load status indicator of claim 16 wherein a bi-color light-emitting diode comprises the first and second visual status indicators.

18. The load status indicator of claim 14 wherein the indicating component further comprises:
a first transistor configured to control whether current can flow through the first visual status indicator; and
a second transistor configured to control whether current can flow through the second visual status indicator.

* * * * *